INVENTORS:
TRYGVE HALVORSEN
ARTHUR COZZA
BY
ATTORNEY

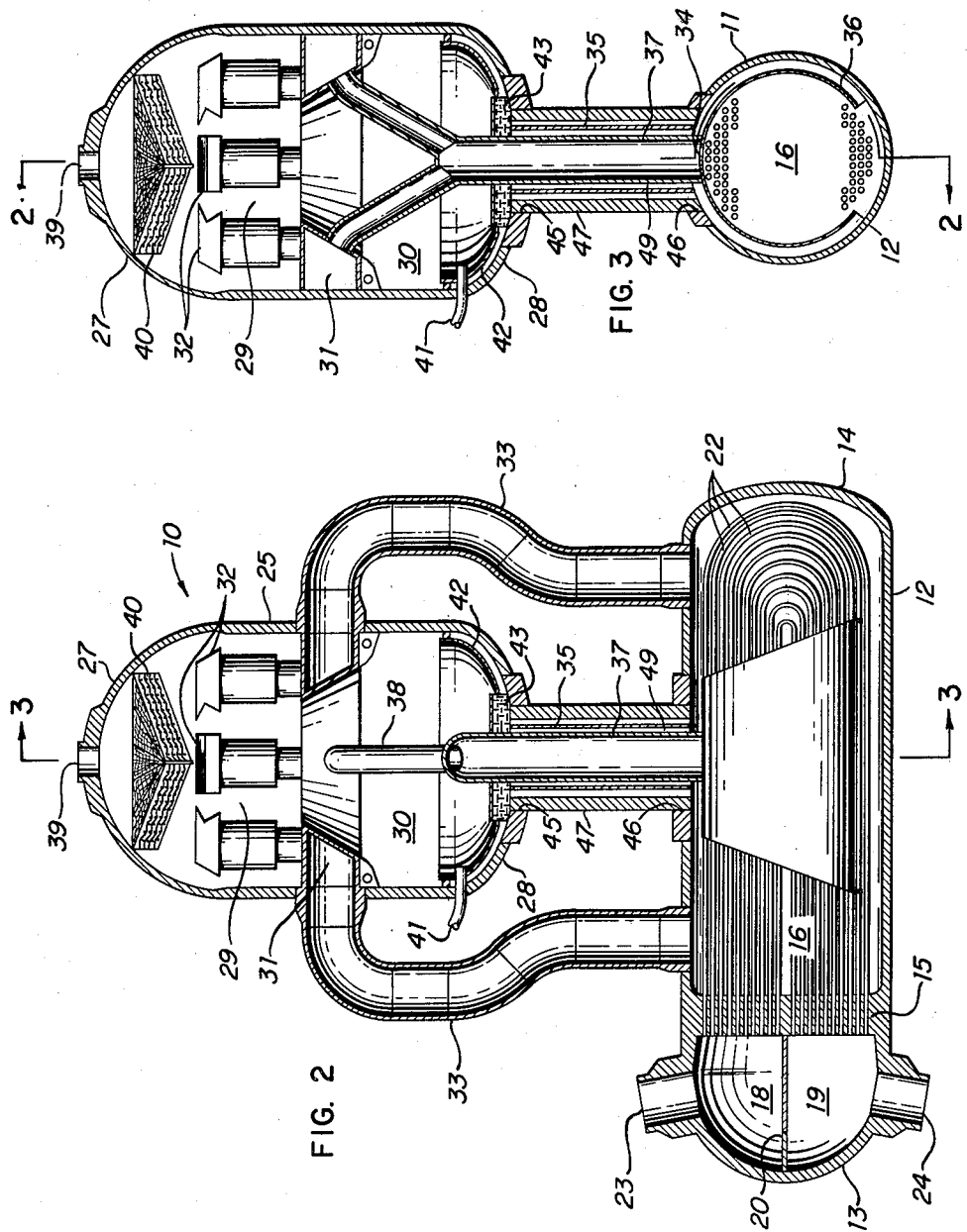

United States Patent Office 3,103,206
Patented Sept. 10, 1963

3,103,206
SHELL AND TUBE TYPE VAPOR
GENERATING UNIT
Trygve Halvorsen and Arthur Cozza, Chattanooga, Tenn., assignors to Combustion Engineering, Inc., Windsor, Conn., a corporation of Delaware
Filed Dec. 26, 1961, Ser. No. 161,780
5 Claims. (Cl. 122—34)

This invention relates to a vapor generating unit in which heat is supplied by means of a hot fluid. More particularly, it relates to a shell and tube type vapor generating unit wherein heat is supplied to a vaporizable medium by passing a hot fluid through tubes which are located in a shell which contains the vaporizable medium, most commonly water.

At the present time high temperature fluids are made available for heating purposes in such industries as petroleum refining, chemical manufacturing and other diverse industries. From these fluids heat may be extracted to vaporize a liquid such that the so-created vapor can perform useful functions. The present invention relates to such a vapor generating system wherein pressurized water, sodium, steam, gases or other fluid substances in a hot condition are passed through heat exchanger tubes housed in a shell containing a vaporizable substances, such as water, whereby steam is generated.

The present unit provides an improved vapor generator design in which the shortcomings of heretofore existing units of the shell and tube type have been eliminated. The unit is designed to be contained in the minimum of space and to transfer large quantities of heat in a highly efficient manner.

The herein disclosed steam generator is of the type which comprises a horizontally arranged vapor generating chamber in which is located a tube bundle consisting of U-shaped heat exchanger tubes. Through the tubes is passed a heating medium comprising a hot liquid, such as pressurized water, liquid metal, petroleum or gas. For the purpose of illustration the heating medium in this case will be considered to be pressurized water. A vaporizable liquid, such as water, is fed into the vapor generating chamber and extracts heat from the heating medium whereby steam is created. The steam so created passes from the chamber through riser tubes into a vapor and liquid drum located adjacent to the chamber wherein is positioned a plurality of turbo-type steam separator units from which the steam is caused to emerge as substantially dry steam. Water separated from the steam falls to the bottom of the drum from whence it passes through a central downcomer tube into the vapor generation chamber. Fluid inlets are provided in the vapor and liquid drum which permit additional water to be added to the system. The additional water mixes with the water separated from the steam and also passes through the downcomer.

Immediately adjacent the downcomer outlet a baffle is provided in the vapor generation chamber. The baffle substantially encompasses a portion of the bundle of heat exchanger tubes and directs the fluid from the downcomer outlet to the bottom of the vapor generation chamber so as to insure efficient utilization of all the heat exchanger tubes. In the vapor generation chamber the water extracts heat from the hot liquid passing through the heat exchanger tubes and is transformed into steam. Saturated steam flows from the vapor generation chamber by way of a plurality of riser tubes into the vapor and liquid drum whereupon the cycle is repeated.

There are several advantages to be derived from this type of steam generator. It provides a highly efficient means of creating saturated steam whereby a minimum amount of space is required. It also provides an economical means of supplying steam in large quantities which may perform many useful functions.

In spite of their many desirable features, units of this type have been found to possess a serious detriment. It has been discovered that such units are subjected to chemical hide out which seriously impairs their operation. The hide out is found to appear in that area of the vapor generation chamber which underlies the downcomer baffle and is created by the fluid stagnation which exists in that portion of the unit as a result of the impedance to fluid flow created by the downcomer baffle.

Chemical hide out has an adverse effect upon the operation of a steam generating unit. Some of the chemicals which are capable of separating out of the fluid, such as chlorides, form corrosive deposits on the heat exchanger tubes. Such deposits are harmful in that they result in first, a deterioration of the tubes which ultimately requires shutdown of the unit and, since, replacement of the tubes is virtually impossible, a plugging of the tube ends thereby reducing the number of useful tubes in the unit. Secondly, the heating surface of the tubes is reduced resulting in a decrease of unit efficiency and thirdly, fluid circulation is impeded resulting in a magnification of the stagnancy problem.

In order to alleviate the problem it became necessary to discover a means whereby the fluid housed in the vapor generation chamber could be induced to circulate throughout the entire chamber. The problem was magnified by the fact that means were necessary which would not detract from the compactness of the unit yet would provide the amount of fluid circulation that would prevent chemicals from settling out on the heat exchanger tubes. By means of the present invention a vapor generator has evolved in which all of the shortcomings of the above-mentioned unit have been eliminated. The present unit is characterized by compactness of form, and efficiency and economy of operation stemming from the free fluid circulation imparted to it by the inventive concept.

The invention relates particularly to the reduction of corrosive deposits on heat exchanger tubes of a shell and tube type of vapor generating unit.

A general object of the invention therefore is to provide a novel means for reducing such deposits.

Another object of the invention is to provide a novel vapor generating unit wherein fluid circulation is increased.

Still another object of the invention is to provide a novel vapor generating unit of the shell and tube type characterized by compactness of form and economy of operation.

Other objects and advantages will become apparent from the following description with the accompanying drawings which disclose a preferred embodiment of the invention.

Of the drawings:

FIG. 2 is a longitudinal section taken along line 2—2 of FIG. 3;

FIG. 3 is a transverse section taken along line 3—3 of FIG. 2.

Figure 1:
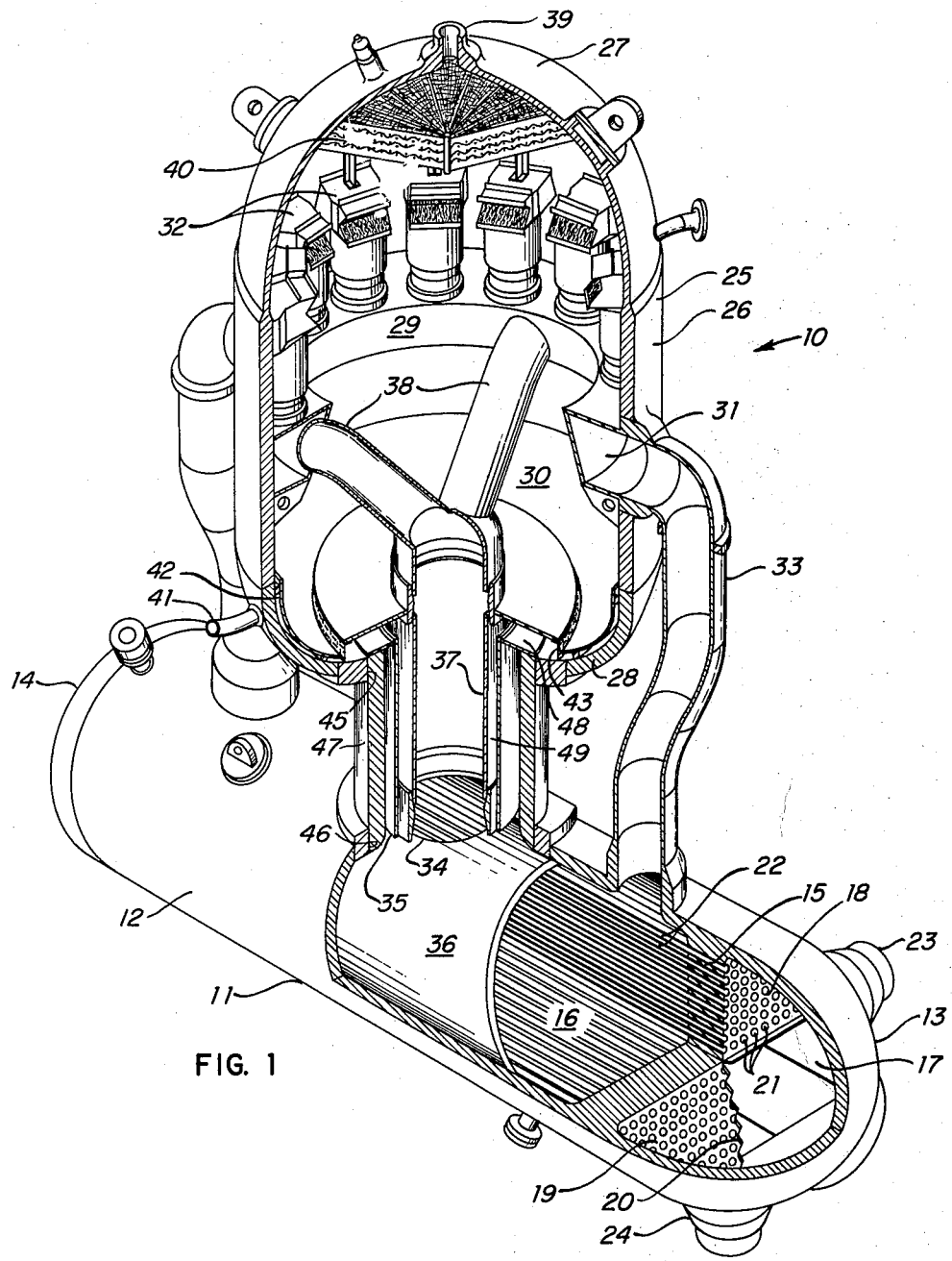
FIG. 1 is a cutaway perspective of the novel vapor generator which forms the instant invention.

The vapor generating unit 10 comprises a horizontally elongated, substantially cylindrical vessel 11 formed of a tubular wall 12 having its ends closed by means of dish shaped end walls 13 and 14. Adjacent to, but removed from the end wall 13 is located a tube sheet 15 positioned transversely of the centerline of the tubular wall 12 and dividing the vessel 11 into a vapor generation chamber 16 and a hot liquid chamber 17. The hot liquid chamber is, in turn, divided into inlet and outlet portions, 18 and 19 respectively, by means of a lateral divider plate 20 which is attached to the mid-portions of end wall 13 and the tube sheet 15.

Tube sheet 15 possesses a plurality of longitudinal apertures 21 which receive the ends of U-shaped heat exchanger tubes 22. Tubes 22 form a horizontally elongated tube bundle which extends throughout the vapor generation chamber 16 in which a vaporizable medium, such as water, is permitted to circulate.

End wall 13 is provided with hot liquid inlet and outlet means 23 and 24, which communicate with the hot liquid inlet and outlet portions 18 and 19 of the hot liquid chamber 17. Through the hot liquid inlet is passed a heat imparting liquid such as pressurized water from a heat source. The liquid is permitted to flow from the hot liquid inlet portion 18 through the heat exchanger tubes 22 giving up its heat to the vaporizable medium in the vapor generation chamber 16 and passing out of the hot liquid outlet portion 19 where it returns to the heat source completing its cycle. As shown, the ends of the tubes 22 are connected to the tube sheet 15 such that one end communicates with the inlet portion 18 of the hot fluid chamber and the other end communicates with the outlet portion 19 directing the fluid on a U-shaped course through the vapor generation chamber 16.

A vapor and liquid drum 25 comprising a substantially vertically elongated cylindrical vessel 26 is positioned adjacent the vapor generating vessel 11 with its center line being substantially normal to the center line of the aforementioned vessel. The top of the vessel 26 is closed by means of a substantially hemispherical end wall 27 and the bottom is closed by means of a dish shaped end wall 28. The drum is divided into an upper vapor portion 29 and a lower liquid portion 30 arbitrarily determined by the state of the medium which exists in the respective portions. Within the drum is positioned an annular vapor collector box 31 which is attached to the cylindrical wall of the vessel. Around the upper surface of the vapor collector box 31 are positioned a plurality of turbo-type vapor separator units 32. Diametrically opposed openings are provided in the cylindrical wall and the vapor collector box to accommodate a pair of riser tubes 33 which communicate with the vapor generation chamber of the vapor generation vessel 11.

In the dish-shaped end 28 forming the bottom of the vapor and liquid drum 25 and in the upper surface of the vessel 11 forming the vapor generation chamber 16 are located openings 45 and 46 which are aligned with one another and which receive the ends of a cylindrical connecting member 47. The ends of the connecting member are joined to the vapor and liquid drum end 28 and the vessel 11 thereby forming a passage between the two bodies. Within this passage is located a cylindrical downcomer annulus 35 concentric with and spaced from the connecting member 47. The upper end of the downcomer annulus 35 is attached to the upper end of the connecting member 47 by means of a circular plate 48 which spaces the annulus 35 from the wall of the connecting member 47 and from the center riser 37 to thereby define a downcomer passage 49 in communication with the lower liquid portion 30 of the vapor and liquid drum 25. The lower end of the annulus 35 is unsupported so as to permit communication between the downcomer passage 49 formed thereby with the vapor generation vessel 11.

Immediately beneath the opening 46 in the vapor generation vessel 11 is positioned a substantially annular baffle 36 which is horizontally oriented and which extends over the top and sides of a portion of the heat exchanger tubes 22 which define the tube bundle. The baffle 36 is positioned in spaced relation with the inner surface of the vessel 11 and partially encompasses the tube bundle thereby forming a passage around the tube bundle which directs the downcomer fluid to the bottom of the vapor generation chamber 16. As shown, the ends of the downcomer baffle 36 are spaced a considerable distance from the opposed ends of the vapor generation chamber 16. Riser tubes 33 communicate with the vapor generation chamber 16 beyond the ends of the baffle 36 permitting the withdrawal of vapor from this portion of the chamber 16 and delivery thereof to the vapor collector box 31 in the vapor and liquid drum 25. In order to remove vapor from beneath the baffle 36 and thus enhance circulation within that portion of the vapor generation chamber 16, a center riser 37 is provided and extends between the vapor generation chamber 16 and the vapor and liquid drum 25. The center riser 37 is concentrically positioned with respect to both the cylindrical connecting member 47 and the downcomer annulus 35. By means of an aperture 34 in the upper portion of the downcomer baffle 36 the center riser 37 is permitted to penetrate the baffle and thus establish communication with that portion of the vapor generation chamber 16 which underlies the baffle 36. The lower end of the riser 37 is attached to the baffle 36 while its upper end is joined to the vapor collector 31 by means of a pair of tubular members 38 which provide the riser 37 with a bifurcated end to distribute the vapor and liquid mixture emerging from the vapor generation chamber to opposed parts of the collector box 31.

Because of the center riser's communication with that portion of the vapor generation chamber 16 which underlies the downcomer baffle 36 there is eliminated an extensive portion of the chamber having no outlet means to the vapor and liquid drum 25 where a condition of fluid stagnancy may exist. By reducing the area between vapor outlets an increase of fluid circulation within the unit is established. More especially, by positioning a riser such that it communicates with that portion of the chamber in which stagnancy is most apt to occur stagnation is eliminated and circulation enhanced throughout the chamber.

The hemispherical end wall 27 of the vapor and liquid drum 25 is provided with a vapor outlet 39 from which the vapor created in the generator unit can pass to a turbine installation or the like where it can be utilized. Immediately adjacent the vapor outlet 39 is positioned a screen drier 40 through which the vapor passes from the vapor portion 29 of the drum to the vapor outlet. The drier 40 removes any droplets of water entrained in the steam emitted by the steam separators 32.

Fluid feed lines 41 communicate with the lower portion of the drum at feedwater inlets and deliver the vaporizable medium, or water, to the unit. Baffle means 42 are provided immediately adjacent the feedwater inlets and direct the feedwater to the downcomer annulus 35. Before entering the downcomer annulus 35 the feedwater must pass through an annular screen 43 positioned in the lower portion of the drum. The screen 43 is formed of a plurality of individual baffle members which change the direction of flow of the feedwater from the swirling pattern which exists in the drum to a smooth, uniform flow through the downcomer annulus 35 thereby eliminating any tendency for a vortex flow to develop within the downcomer 37.

The operation of the vapor generator unit is as follows. Feedwater enters the liquid portion 30 of the vapor and liquid drum 25 through the feedwater inlet 41 from whence it is directed toward the downcomer annulus 35 by means of the annular baffle 42. The baffle 42 also serves to prevent cold feedwater from coming into direct contact with the wall of the drum 25. Before entering the downcomer annulus 35 the feedwater must pass through the annular screen 43 whereby a regular flow pattern is established through the downcomer annulus. The feedwater next encounters the downcomer baffle 36 which directs it around the tube bundle to the lowermost reaches of the vapor generation chamber 16.

In the meantime hot pressurized water is delivered from a heat source and enters the inlet portion 18 of the hot liquid chamber through the inlet means 23. From the chamber the hot liquid flows through the U-shaped heat exchanger tubes 22 where heat is extracted therefrom and imparted to the feedwater thus creating steam. The saturated steam so created flows from the vapor generation chamber 16 up the riser tubes 33 and 37 into the vapor collector box 31 which acts as a header receiving the several riser outlets. From the collector box 31 the saturated steam passes through the several vapor separator units 32 mounted on and communicating with the collector box 31 where liquid retained in the steam is driven off and falls into the liquid portion 30 of the drum where it mixes with the incoming feedwater and is recirculated through the vapor generation chamber 16.

The steam which is now substantially dry passes through the screen drier 40 located at the top of the vapor and liquid drum 25 where any entrained liquid is finally removed before the steam emerges from the vapor outlet 39.

By providing the center riser 37 which communicates with the vapor generation chamber 16 through the downcomer baffle 36 there is now insured free circulation within the vapor generation chamber 16 in that area enclosed by the baffle thus eliminating any possibility for stagnancy to exist in the chamber. By removing the stagnant condition and creating free circulation in the chamber hide out of chemicals is prevented and with it the several adverse effects which result therefrom.

While there has been disclosed a particular embodiment of the invention this disclosure is intended to merely illustrate and not to limit the inventive concept. It is understood that changes may be made in the form of the apparatus disclosed without departing from the spirit of the invention covered by the appended claims.

What is claimed is:

1. A vapor generating unit comprising an elongated vapor generation chamber and a detached vapor drum positioned adjacent thereto, said vapor generation chamber being circular in cross section and having disposed therein a tube sheet positioned near one end thereof, said tube sheet containing a plurality of apertures receiving the ends of a plurality of elongated U-shaped tubes forming a tube bank, plate means extending between the end wall of said vapor generation chamber and said tube sheet dividing the end portion of said chamber into a hot fluid inlet portion and a hot fluid outlet portion, the ends of said tubes communicating with each of said inlet and outlet portions, said vapor and liquid drum being circular in cross section and having an upper vapor space and a lower liquid space, an annular vapor and liquid collector box being attached to the wall of said drum, a plurality of steam separator means supported by said vapor and liquid collector box and communicating therewith, a vapor outlet means communicating with said vapor space and a liquid inlet means communicating with said liquid space, cylindrical passage means connecting said liquid space to said vapor generation chamber, baffle means underlying said passage means, said baffle means extending along a portion of said tube bank and partially encompassing said tube bank to direct the liquid flow from said liquid space to the bottom of said vapor generation chamber, fluid conducting means interconnecting said vapor generation chamber and said vapor and liquid collector box, said conducting means comprising a fluid bearing tube located adjacent each end of said vapor generation chamber and a third tube concentrically mounted within said cylindrical passage means, said last mentioned tube penetrating said baffle means and communicating with that portion of said vapor generation chamber which is partially enclosed by said baffle means, the other end of said tube being bifurcated with each of said so defined offsets communicating with said vapor and liquid collecting box whereby circulation is provided within all parts of said vapor generation chamber.

2. A vapor generating unit comprising a horizontally elongated vapor generation chamber and a detached, vertically oriented vapor and liquid drum positioned adjacent thereto; a plurality of fluid bearing tubes in the form of a tube bundle substantially filling said vapor generation chamber; means for passing a heating fluid through said tubes; said vapor and liquid drum having an upper vapor space and a lower liquid space; a fluid collector positioned within said drum; separator means communicating with said fluid collector for delivering separated vapor to said vapor space and separated liquid to said liquid space; vapor outlet means communicating with said vapor space and liquid inlet means communicating with said liquid space, annular downcomer passage means connecting said liquid space to said vapor generation chamber; baffle means underlying said passage in spaced relation from the wall of said vapor generation chamber, said baffle means extending about the top and side portions of the wall of said vapor generation chamber and encompassing said tube bundle over a substantial portion of its periphery; fluid conducting means comprising a fluid bearing tube mounted within said passage means having one end penetrating said baffle means at substantially the top thereof and communicating with that portion of said vapor generation chamber enclosed by said baffle means and the other end in communication with said fluid collector.

3. The vapor generating unit recited in claim 2 wherein said baffle means extends toward but terminates short of each end of said vapor generation chamber and said fluid conducting means further includes fluid bearing tubes having one of their ends penetrating the wall of said vapor generation chamber at points beyond the ends of said baffle means and the other of their ends penetrating the wall of said drum to communicate with said fluid collector.

4. A vapor generating unit comprising a horizontally elongated vapor generation chamber and a detached, vertically oriented vapor and liquid drum positioned adjacent thereto; a plurality of fluid bearing tubes in the form of a tube bundle substantially filling said vapor generation chamber; means for passing a heating fluid through said tubes; said vapor and liquid drum having an upper vapor space and a lower liquid space; a fluid collector positioned within said drum; separator means communicating with said fluid collector for delivering separated vapor to said vapor space and separated liquid to said liquid space; vapor outlet means communicating with said vapor space; liquid inlet means communicating with said liquid space; a connecting cylinder communicating with and joining said vapor generation chamber and said vapor and liquid drum; cylindrical plate means within said connecting cylinder forming an annular downcomer passage from said liquid space to said vapor generation chamber; baffle means underlying said passage in spaced relation from the wall of said vapor generation chamber, said baffle means extending about the top and side portions of the wall of said vapor generation chamber and encompassing said tube bundle over a substantial portion of its periphery; fluid conducting means comprising a fluid bearing tube concentrically mounted within said cylindrical plate means having one end penetrating said baffle means at substantially the top thereof and communicating with that portion of said vapor generation chamber enclosed by said baffle means and the other end communicating with said fluid collector.

5. The vapor generating unit recited in claim 4 wherein said baffle means extends toward but terminates short of each end of said vapor generation chamber and said fluid conducting means further includes fluid bearing tubes having one of their ends penetrating the wall of said vapor generation chamber at points beyond the ends of said baffle means and the other of their ends penetrating the wall of said drum to communicate with said fluid collector.

References Cited in the file of this patent

UNITED STATES PATENTS

| | | |
|---|---|---|
| 2,845,906 | Gram | Aug. 5, 1958 |
| 2,862,479 | Blaser et al. | Dec. 2, 1958 |
| 2,904,013 | Davies et al. | Sept. 15, 1959 |

FOREIGN PATENTS

| | | |
|---|---|---|
| 867,306 | Great Britain | May 3, 1961 |